United States Patent
Khosrowpour (10) Patent No.: US 11,010,966 B2
(45) Date of Patent: May 18, 2021

(54) SYSTEM AND METHOD FOR CREATING GEO-LOCALIZED ENHANCED FLOOR PLANS

(71) Applicant: The Joan and Irwin Jacobs Technion-Cornell Institute, New York, NY (US)

(72) Inventor: Ardalan Khosrowpour, New York, NY (US)

(73) Assignee: The Joan and Irwin Jacobs Technion-Cornell Institute, New York, NY (US)

( * ) Notice: Subject to any disclaimer, the term of this patent is extended or adjusted under 35 U.S.C. 154(b) by 34 days.

(21) Appl. No.: 16/220,709

(22) Filed: Dec. 14, 2018

(65) Prior Publication Data
US 2019/0197769 A1    Jun. 27, 2019

Related U.S. Application Data

(60) Provisional application No. 62/598,670, filed on Dec. 14, 2017.

(51) Int. Cl.
*G06T 17/05* (2011.01)
*G06T 17/00* (2006.01)
(Continued)

(52) U.S. Cl.
CPC ............ *G06T 17/05* (2013.01); *G06K 9/6202* (2013.01); *G06T 5/002* (2013.01); *G06T 17/00* (2013.01);
(Continued)

(58) Field of Classification Search
None
See application file for complete search history.

(56) References Cited

U.S. PATENT DOCUMENTS 8,026,929 B2 * 9/2011 Naimark ............... G06T 15/205
345/629
8,718,837 B2    5/2014 Wang et al.
(Continued)

FOREIGN PATENT DOCUMENTS

| CN | 106647585 A | 5/2017 |
| CN | 107993389 A | 5/2018 |
| CN | 108732979 A | 11/2018 |

OTHER PUBLICATIONS

Bo-Yi Sung and Chang-Hong Lin, A Fast 3D Scene Reconstructing Method Using Continous Video, Feb. 2017, EURASIP Journal on Image and Video Processing, 18(2017) https://doi.org/10.1186/s13640-017-0168-3 (Year: 2017).*

(Continued)

*Primary Examiner* — Michael J Cobb
(74) *Attorney, Agent, or Firm* — M&B IP Analysts, LLC (57) ABSTRACT

A system and method for creating enhanced floor plans. The method includes converting visual multimedia content into a plurality of frames, wherein the visual multimedia content shows a site, wherein each frame is a two-dimensional (2D) image showing a portion of the site; generating, based on the plurality of frames, a sparse three-dimensional (3D) model of the site, wherein the sparse 3D model includes a point cloud; geo-localizing the sparse 3D model with respect to a site layout model by identifying a plurality of matching features of the site layout model with respect to the sparse 3D model; and creating an enhanced floor plan based on the geo-localization, wherein the enhanced floor plan includes a plurality of floor plan points of the site layout model associated with respective portions of the sparse 3D model.

15 Claims, 5 Drawing Sheets

(51) Int. Cl.
    *G06T 5/00*         (2006.01)
    *G06K 9/62*         (2006.01)
    *G06T 19/00*       (2011.01)
    *G06T 7/579*       (2017.01)
    *G06K 9/00*         (2006.01)

(52) U.S. Cl.
    CPC .......... *G06T 19/00* (2013.01); *G06T 2200/24* (2013.01); *G06T 2207/10016* (2013.01); *G06T 2210/04* (2013.01); *G06T 2210/56* (2013.01); *G06T 2219/004* (2013.01)

(56) References Cited

U.S. PATENT DOCUMENTS

| | | | |
|---|---|---|---|
| 9,804,751 | B2 | 10/2017 | Petrucci et al. |
| 10,026,218 | B1* | 7/2018 | Mertens ................. G06T 17/00 |
| 2012/0239191 | A1 | 9/2012 | Versteeg et al. |
| 2012/0243742 | A1* | 9/2012 | Sato .................. G06K 9/00288 382/103 |
| 2013/0155058 | A1* | 6/2013 | Golparvar-Fard ...... G06T 17/00 345/419 |
| 2013/0195351 | A1* | 8/2013 | Hamada ................. G06T 11/00 382/159 |
| 2016/0027051 | A1 | 1/2016 | Gross |
| 2016/0048934 | A1 | 2/2016 | Gross |
| 2016/0092959 | A1 | 3/2016 | Gross |
| 2017/0228606 | A1* | 8/2017 | Guan ........................ G06T 7/90 |
| 2017/0293821 | A1* | 10/2017 | Shibata .................. G06K 9/46 |
| 2018/0115672 | A1* | 4/2018 | Tomi .................. G06K 9/00483 |
| 2018/0276793 | A1* | 9/2018 | Kwon .................. H04N 13/156 |
| 2018/0276885 | A1* | 9/2018 | Singh ...................... G06T 17/20 |
| 2019/0384969 | A1* | 12/2019 | Shimauchi .......... G06K 9/4642 |
| 2019/0385297 | A1 | 12/2019 | Khosrowpour et al. |
| 2020/0074730 | A1* | 3/2020 | Shloosh ................. G06T 17/05 |

OTHER PUBLICATIONS

Andrea Cohen, Johannes L. Schonberger, Pablo Speciale, Torsten Sattler, Jan-Michael Frahm, Marc Pollefeys, Indoor-Outdoor 3D Reconstruction Alignment, 2016, Computer Vision—ECCV 2016 Lecture Notes in Computer Science, vol. 9907, pp. 285-300 (Year: 2016).*

Shawn McCann, 3D Reconstruction from Multiple Images, May 2015, retrieved from https://web.stanford.edu/class/cs231a/prev_projects_2015/CS231a-FinalReport-sgmccann.pdf (Year: 2015).*

Vidyasagar Sadhu, Gabriel Salles-Loustau, Dario Pompili, Saman Zonouz, Vincent Sritapan, Argus: Smartphone-Enabled Human Cooperation via Multi-agent Reinforcement Learning for Disaster Situational Awareness, 2016, 2016 IEEE International Conference on Autonomic Computing (ICAC), 10.1109/ICAC.2016.43 (Year: 2016).*

Yasutaka Furukawa, Brian Curless, Steven M. Seitz, Richard Szeliski, Reconstructing Building Interiors from Images, 2009, 2009 IEEE 12th International Conference on Computer Vision, 10.1109/ICCV.2009.5459145 (Year: 2009).*

Ricardo Cabral, Yasutaka Furukawa, Piecewise Planar and Compact Floorplan Reconstruction from Images, 2014, 2014 IEEE Conference on Computer Vision and Pattern Recognition, 10.1109/CVPR.2014.546 (Year: 2014).*

Kevin K. Han, Potential of Big Visual Data and Building Information Modeling for Construction Performance Analytics: An Exploratory Study, Jan. 2017, Automation in Construction, vol. 73, pp. 184-198, https://doi.org/10.1016/j.autcon.2016.11.004 (Year: 2017).*

Jun Yang, Man-Woo Park, Patricio A. Vela, Mani Golparvar-Fard, Construction Performance Monitoring via Still Images, Time-lapse Photos, and Video Streams: Now, Tomorrow, and the Future, 2015, Advanced Engineering Informatics, 29(2):211-224, https://doi.org/10.1016/j.aei.2015.01.011 (Year: 2015).*

Iryna Gordon and David G. Lowe, "What and Where: 3D Object Recognition with Accurate Pose," 2006, Toward Category-Level Object Recognition. Lecture Notes in Computer Science, vol. 4170, pp. 67-82, DOI: https://doi.org/10.1007/11957959_4 (Year: 2006).*

The International Search Report and The Written Opinion of the International Searching Authority, Nov. 14, 2019, ISA/RU, Moscow, Russia.

International Search Report and Written Opinion of International Searching Authority for PCT/US2018/065712, ISA/RU, Moscow, Russia, dated May 6, 2019.

Mattyus et al., "Enhancing Road Maps by Parsing Aerial Images Around the World", IEEE Xplore, 2015, pp. 1689-1697.

Suveepattananont, et al., "Sparse 3D Model Reconstruction from photographs", Project Blog: cis-497-3dreconstruction.blogspot.com, University of Pennsylvania, pp. 1-8.

A First Office Action for Canadian Patent Application No. 3,089,307, dated Dec. 24, 2020, CIPO, Canadian Intellectual Property Office, Quebec, Canada.

A Second Office Action for Canadian Patent Application No. 3,089,307, dated Feb. 25, 2021, CIPO, Canadian Intellectual Property Office, Quebec, Canada.

* cited by examiner

SYSTEM AND METHOD FOR CREATING GEO-LOCALIZED ENHANCED FLOOR PLANS

CROSS-REFERENCE TO RELATED APPLICATIONS

This application claims the benefit of U.S. Provisional Application No. 62/598,670 filed on Dec. 14, 2017, the contents of which are hereby incorporated by reference.

TECHNICAL FIELD

The present disclosure relates generally to digital representations of building layouts, and more specifically to geo-localization of walkthrough paths on floor plans.

BACKGROUND

During building construction, builders such as contractors, construction managers, insurers, construction lenders, and safety consultants are interested in monitoring development, ensuring the safety of workers, and assessing the risks workers are taking at all times. To this end, such builders regularly conduct walkthrough inspections (also known as walkthroughs) in which safety hazards, progress delays, and other impediments to project completion may be identified. A typical walkthrough requires substantial attention from builders and is therefore subject to human error that may result in failure to identify building deficiencies. Any deficiencies during construction must typically be addressed as soon as possible and, as a result, failure to identify such deficiencies early in construction can result in significant expenditures to subsequently correct deficiencies or may even result in harm to workers or building occupants.

Due to the need for safety, quality control, progress monitoring, and risk control, walkthroughs are conducted frequently. For example, walkthroughs may be conducted daily, weekly, or monthly. Frequent walkthroughs may require significant devotion of resources, particularly time, due to the attention needed to completely identify all deficiencies. As a result, developers, lenders, investors, insurers, and owners do not document site progress as frequently as would be ideal due to these practical limitations. Additionally, results of the walkthrough may need to be mapped to an appropriate floor plan manually by the person conducting the walkthrough, which requires significantly more time and may result in more errors.

Some existing solutions include a person conducting a walkthrough while capturing images and manually tagging the images with respect to, e.g., a floor plan. However, such existing solutions are typically expensive and time consuming. Thus, these solutions result in a decrease in frequency of walkthroughs for each project to justify the cost of the inspection. On a typical job site, dozens of inspections may need to be conducted per week to provide adequate data. These requirements add significant expense to a project and may interfere with work at the construction site, thereby delaying completion of the project.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for creating enhanced geo-localized floor plans. The method comprises: generating a plurality of frames based on visual multimedia content, wherein the visual multimedia content shows a site, wherein each frame is a two-dimensional (2D) image showing a portion of the site; generating, based on the plurality of frames, a sparse three-dimensional (3D) model of the site, wherein the sparse 3D model includes a point cloud; geo-localizing the sparse 3D model with respect to a site layout model by identifying a plurality of matching features of the site layout model with respect to the sparse 3D model; and creating an enhanced floor plan based on the geo-localization, wherein the enhanced floor plan includes a plurality of floor plan points of the site layout model associated with respective portions of the sparse 3D model.

Certain embodiments disclosed herein also include a non-transitory computer readable medium having stored thereon causing a processing circuitry to execute a process, the process comprising: generating a plurality of frames based on visual multimedia content, wherein the visual multimedia content shows a site, wherein each frame is a two-dimensional (2D) image showing a portion of the site; generating, based on the plurality of frames, a sparse three-dimensional (3D) model of the site, wherein the sparse 3D model includes a point cloud; geo-localizing the sparse 3D model with respect to a site layout model by identifying a plurality of matching features of the site layout model with respect to the sparse 3D model; and creating an enhanced floor plan based on the geo-localization, wherein the enhanced floor plan includes a plurality of floor plan points of the site layout model associated with respective portions of the sparse 3D model.

Certain embodiments disclosed herein also include a system for creating enhanced geo-localized floor plans. The system comprises: a processing circuitry; and a memory, the memory containing instructions that, when executed by the processing circuitry, configure the system to: generate a plurality of frames based on visual multimedia content, wherein the visual multimedia content shows a site, wherein each frame is a two-dimensional (2D) image showing a portion of the site; generate, based on the plurality of frames, a sparse three-dimensional (3D) model of the site, wherein the sparse 3D model includes a point cloud; geo-localize the sparse 3D model with respect to a site layout model by identifying a plurality of matching features of the site layout model with respect to the sparse 3D model; and create an enhanced floor plan based on the geo-localization, wherein the enhanced floor plan includes a plurality of floor plan points of the site layout model associated with respective portions of the sparse 3D model.

BRIEF DESCRIPTION OF THE DRAWINGS

The subject matter disclosed herein is particularly pointed out and distinctly claimed in the claims at the conclusion of the specification. The foregoing and other objects, features.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for creating enhanced floor plans. Visual multimedia content including a plurality of visual multimedia content items such as video, images, or both, is received. The visual multimedia content may be captured during a walkthrough of a site. When the visual multimedia content includes content captured by a three-dimensional (3D) camera (e.g., RGB-D sensors), the 3D content is converted into two-dimensional (2D) images. When the visual multimedia content includes 2D content, 3D sensor data is also received or retrieved.

Based on the visual multimedia content, the 3D sensor data, or both, a sparse 3D model including a cloud of 3D points is generated. The sparse 3D model is mapped to an input site layout model which may be a 2D floor plan model or a 3D building information model illustrating a known layout of a site.

When the input site layout model is a 2D floor plan model, the sparse 3D model is converted into a 2D site model. The 2D site model is geo-localized and mapped to the input 2D floor plan model. The geo-localization includes matching mapping features appearing in both the 2D site model and the 2D floor plan model based on feature reference points of the input 2D floor plan model, determining an orientation of the 2D site model with respect to the input 2D floor plan model, and superimposing the 2D site model on the input 2D floor plan model.

When the input site layout model is a 3D building information model, the sparse 3D model is geo-localized and mapped to the input 3D building information model based on feature reference points of the input 3D building information model, determining an orientation of the sparse 3D model with respect to the input 3D building information model, and superimposing the sparse 3D model on the input 3D building information model.

One or more portions of the visual multimedia content may be associated with corresponding floor plan points on the superimposed 2D site model, thereby providing a view of the site from each of the corresponding floor plan points. Alternatively, the geo-localization may include superimposing the sparse 3D model to a 3D building information model.

Thus, in an embodiment, an input 2D floor plan model and visual multimedia content are utilized to output a superimposed mapping of a walkthrough path to the input 2D floor plan model. In a further embodiment, a floor indicator of the floor in which the walkthrough was conducted may be further utilized as an input in order to distinguish among floors.

The disclosed embodiments provide geo-localization and mapping of visual content to floor plans without requiring manual tagging or other manual mapping of the visual content with respect to the floor plan, thereby creating an enhanced floor plan having floor plant points associated with corresponding visual multimedia content and annotations without requiring human intervention. Specifically, some embodiments disclosed herein utilize machine vision techniques to create a 2D site model of the walkthrough based on visual multimedia content, and geo-localize the 2D site model with respect to distinct features of a 2D floor plan model, thereby mapping the visual multimedia content to a floor plan without requiring tagging of specific images.

Identifying distinct features of the 2D floor plan model in visual content results in increased accuracy and decreased processing time as compared to existing solutions. Moreover, as the disclosed embodiments do not require tagging of visual content in order to map the visual content to the 2D floor plan model, the amount of memory required for storing metadata associated with mapped visual content is reduced.

The disclosed embodiments further provide accurate mapping of a walkthrough to a site while requiring less multimedia content than existing solutions. To this end, the disclosed embodiments allow for use of video multimedia content for mapping, thereby allowing for more rapid data collection while maintaining accuracy of geo-localization and mapping. Specifically, in some implementations, the amount of data collected may only include data captured during a normal walkthrough of the site without requiring a professional photographer. As a result, the data collection process may be minimally intrusive, thereby allowing for construction to continue as data is collected. Furthermore, the cost of data collection may be reduced by increasing the speed and reducing the skillset required to collect the data.

Thus, the disclosed embodiments may be utilized to, for example, significantly reduce the amount of image and video content required by project managers as compared to existing methods. As mentioned above, a typical job site is monitored via dozens of inspections per week. The mapping according to the disclosed embodiments may allow for reducing image and video capturing to a single walkthrough. Additionally, use of computing resources related to transmitting, processing, and storing of such multimedia content is reduced as compared to existing solutions.

The enhanced floor plan may be utilized, for example, to allow for viewing of visual multimedia content of specific floor plan points by selecting a location on the enhanced floor plan (e.g., via a graphical user interface), and may also allow for identifying locations on the enhanced floor plan in which safety hazards may exist. Specifically, machine learning techniques may be utilized to identify potential safety hazards shown in the visual multimedia content element with respect to the 2D floor plan model using a machine learning model trained based on a training set including enhanced floor plans and corresponding safety hazard identifications (e.g., based on user-provided annotations of safety hazards).

In some implementations, the enhanced floor plans may be utilized to allow users to revisit conditions of the site with respect to particular locations of walkthroughs at various times. To this end, groups of visual content items (e.g., images or videos) and annotations representing the site at different times may correspond to the same floor plan points on the enhanced floor plan and a graphical user interface allowing for interactions with the enhanced floor plan may be configured to prompt the user to select a time for which corresponding visual content and annotations is desired.

Enhanced floor plans created according to the disclosed embodiments have direct associations with visual content, thereby increasing user efficiency of reviewing floor plans with respect to safety inspections. In particular, different floor plan points on an enhanced floor plan may each correspond to respective visual content and annotations. The enhanced floor plans may be configured such that only limited data (e.g., a visual representation of the floor plan including the floor plan points) is displayed until a user interacts with one of the floor plan points. When such interaction occurs, the corresponding visual content, annotations, both, or options for selecting display of such corresponding visual content or annotations is displayed, for example, as an overlay over at least a portion of the visual representation of the floor plan. This interactive display may be created according to the disclosed embodiments without manual selection of locations on the floor plan with which to associate particular visual content and annotations.

Figure 1:
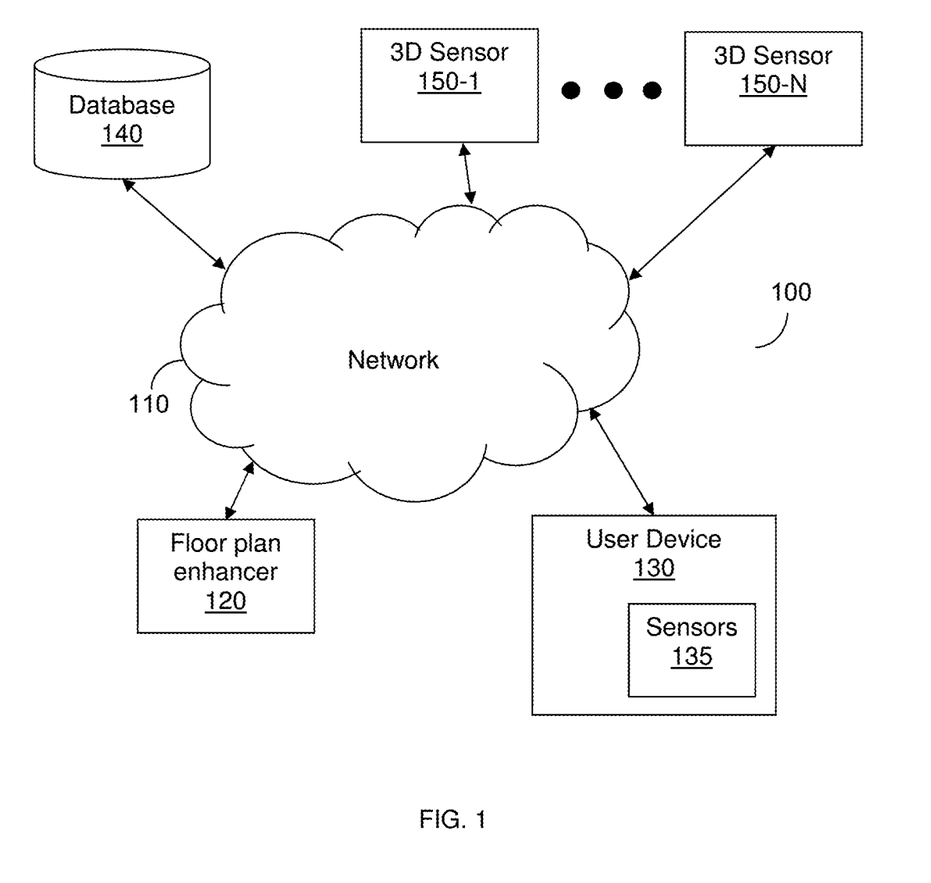
FIG. 1 is a network diagram utilized to describe the various disclosed embodiments.

FIG. 1 shows an example network diagram 100 utilized to describe the various disclosed embodiments. In the example network diagram 100, a floor plan enhancer 120, a user device 130, and a database 140 communicate via a network 110. In some implementations, three-dimensional (3D) characteristic sensors 150-1 through 150-N (hereinafter referred to individually as a 3D sensor 150 and collectively as 3D sensors 150 merely for simplicity purposes) also communicate with the floor plan enhancer 120 over the network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The floor plan enhancer 120 includes a processing circuitry and a memory (e.g., the processing circuitry 210 and the memory 215, FIG. 2), and is configured to perform geo-localization and mapping of walkthroughs to floor plans based on visual multimedia content according to the embodiments disclosed herein.

The user device 130 may be, but is not limited to, a personal computer, a laptop, a tablet computer, a smartphone, a wearable computing device, or any other device capable of capturing, storing, and sending visual multimedia content. The user device 130 is configured to send, to the floor plan enhancer 120, visual multimedia content captured at a site. In some implementations, the user device 130 may include one or more sensors 135 configured to capture the visual multimedia content.

In some implementations, the user device 130 may further include or otherwise deployed alongside environmental sensors (not shown) such as, but not limited to, temperature sensors, smoke detectors, gyroscopes. accelerometers, and the like. The environmental sensors may be configured to capture sensor signals used for determining environmental parameters, for estimating subsequent locations along a walkthrough path, both, and the like.

As a non-limiting example, the user device 130 may be a smart phone including a camera. The smart phone may be affixed to a hardhat and utilized to capture, via the camera, 2D video showing a walkthrough of a construction site. As another non-limiting example, the user device 130 may be a laptop computer configured to receive images captured by a 360-degree camera that is mounted on a hardhat of an inspector during a walkthrough of a site.

The database 140 stores site layout models representing sites or portions thereof. The site layout models may include, but are not limited to, 2D floor plan models, 3D building information models, and the like. The 2D floor plan models may include unenhanced floor plans of known sites, enhanced floor plans created by the floor plan enhancer 120, or both. Each 2D floor plan model may be, for example, an image including various features of the site.

The 3D characteristic sensors 150 are configured to collect data which may be utilized to create digital 3D representations of portions of a site. In an example implementation, the 3D characteristic sensors 150 may be or may include Light Imaging, Detection, and Ranging (LIDAR) sensors configured to measure distance to a target portion of the site based on time, wavelength, or both, of a pulsed light. The 3D characteristic sensors may be deployed at the site depicted in one of the floor plans such that measurements from the 3D characteristic sensors 150 may be utilized to create 3D representations of portions of the site that are illustrated in visual multimedia content captured at the site.

In an embodiment, the floor plan enhancer 120 is configured to create enhanced floor plans based on input site layout models for a site and visual multimedia content illustrating portions of the site. A sparse 3D model is created based on the visual multimedia content and mapped to an input site layout model. Then enhanced floor plan is created based on the mapping. The visual multimedia content may include, but is not limited to, images, video, or both, illustrating a tour (e.g., a walkthrough) of the site.

In an embodiment, the floor plan enhancer 120 is configured to receive visual multimedia content from the user device 130. The visual multimedia content may include, but is not limited to, images, video, or both. The visual multimedia content element may be 2D or 3D content captured during a walkthrough of a site. When the visual multimedia content is 2D content, 3D characteristic data may be received or retrieved from one or more of the 3D characteristic sensors 150. Moreover, if the 2D content is in a video format, the 3D content can be 2D images included in the 2D video content.

In an embodiment, when the visual multimedia content includes 3D content, the floor plan enhancer 120 is configured to convert the 3D content into a sequence of frames, where each of the frames is a 2D image. The floor plan enhancer 120 is configured to generate a sparse 3D model based on the sequence of frames or based on the 2D images and 3D characteristic data captured by the 3D characteristic sensors 150.

In an embodiment, the floor plan enhancer 120 is configured to perform geo-localization and mapping of the sparse 3D model with respect to the site layout model. To this end, in a further embodiment, the floor plan enhancer 120 is configured to convert the sparse 3D model into a 2D model and to perform feature matching between the 2D model and an input 2D floor plan model of the site in order to determine an orientation of the 2D model relative to the input 2D floor plan model. In another embodiment, the floor plan enhancer 120 is configured to superimpose the sparse 3D model on a 3D building information model of the building.

The matching includes matching distinct feature sets, each distinct feature set including one or more features that uniquely identify a portion of the site. Each feature set is defined with respect to an arrangement of feature reference points, where the arrangement of the feature reference points for the feature does not change based on the orientation. The features may include, but are not limited to, corners, columns, walls, and the like. As a non-limiting example, a distinct feature set may include a corner. As another non-limiting example, a distinct feature set may include two or more square columns.

The floor plan enhancer 120 may be configured to retrieve the input 2D floor plan model from the database 140. To this end, the floor plan enhancer 120 may receive (e.g., from the user device 130) a floor identifier indicating the building, floor, location, and the like, of the site to be mapped. The retrieved floor plan may be associated with the floor identifier.

In an embodiment, features identified during the matching may be added to a features dictionary. Thus, the features dictionary may be utilized to determine orientation based on matching one or more features between a 2D model and an input floor plan. The floor plan enhancer 120 may store the features dictionary locally, in the database 140, or both.

As a non-limiting example for a set of distinct features including a T-column, the T-column may be defined in the features dictionary with respect to a particular arrangement of feature reference points. Thus, orientations may be subsequently determined based on instances of the particular arrangement of feature reference points of the T-column matched between a 2D site model and a 2D floor plan model.

In a further embodiment, the features dictionary may further include indications of whether features are known noisy features that impede mapping of visual multimedia content to a floor plan. The noisy features include features that are not included in a floor plan and, therefore, are not used for mapping with respect to the floor plan. As non-limiting examples, noisy features may include people, tools, animals, ladders, hazards (e.g., spilled liquids), and other features that are not representative of the site. Features that are not designated as noisy typically include permanent or semi-permanent features that do not leave the site or change portions of the site regularly such as beams, walls, fixtures, doors, doorways, and the like.

When creating a 3D model of a scene, features identified in visual multimedia content that match predetermined noisy features in the features dictionary may be first removed from the visual multimedia content such that the noisy features are not used for generating the sparse 3D model. The noisy features may be subsequently added to the visual multimedia content once it is included in an enhanced floor plan.

With respect to noisy features, it has been identified that, when geo-localizing visual multimedia content to floor plans, features that are only temporarily present at the site or at a specific portion of the site add a significant amount of noise that interferes with computer processing related to generating the sparse 3D model and geo-localizing the sparse 3D model to a floor plan. Further, an overabundance of noisy features may result in breaking of the sparse 3D model such that the sparse 3D model cannot be accurately mapped to a floor plan. Thus, removing noisy features before creating and geo-localizing the 3D model allows for more efficient and accurate geo-localization and mapping with respect to a floor plan.

In an embodiment, based on the determined orientation, the floor plan enhancer 120 is configured to superimpose the 2D site model on the 2D floor plan model or to superimpose the sparse 3D model on the 3D building information model, thereby creating an enhanced floor plan. The superimposed model may include capture points, where each capture point is a floor plan point that represents a location within the site at which visual multimedia content was captured. The visual multimedia content captured at each capture point may be associated with that capture point. Thus, when the visual multimedia content includes 3D content, the enhanced floor plan may provide a 360 degree or other 3D view of the site from the perspective of each location occupied during a walkthrough.

In an embodiment, points on the enhanced floor plan may be associated with corresponding visual representations. As a non-limiting example, each floor plan point on the enhanced floor plan may be a portion of the site occupied during a walkthrough of the site that is associated with a 2D or 3D image captured from that portion of the site. A graphical user interface including the enhanced floor plan may allow users to interact with a point on the enhanced floor plan, thereby triggering a display of the visual representation associated with the point.

Figure 4A:
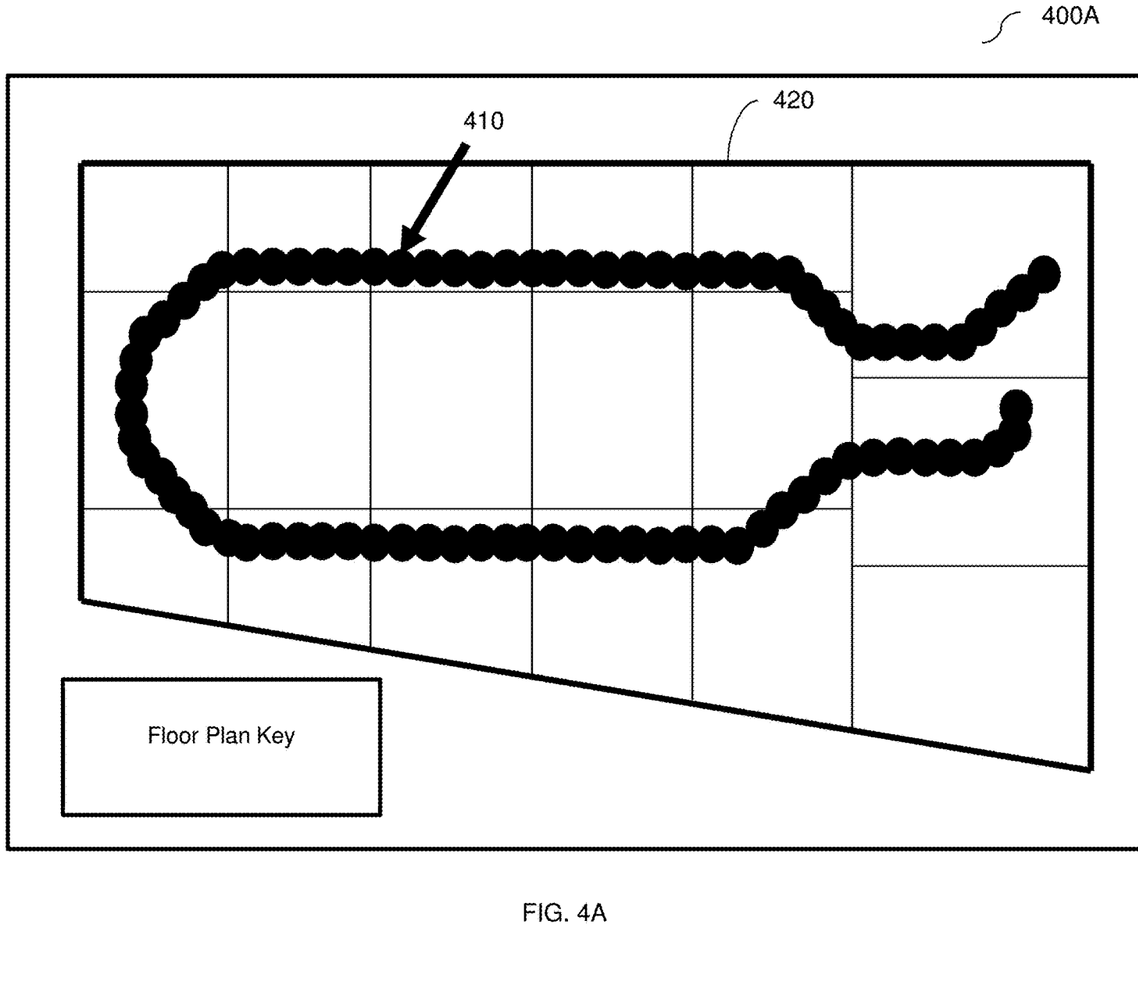
FIGS. 4A and 4B are screenshots of an enhanced floor plan.
Figure 4B:
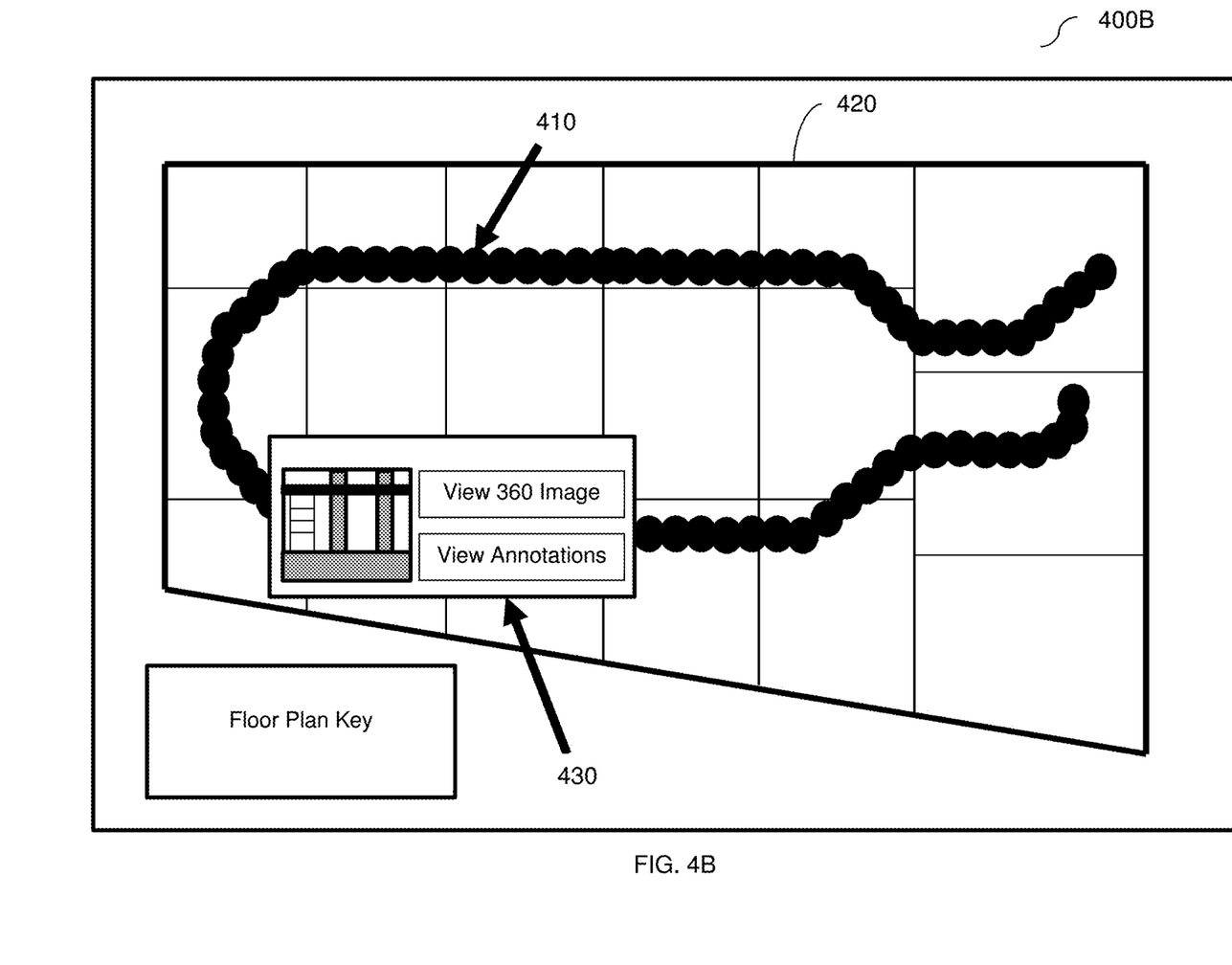

FIGS. 4A and 4B are example screenshots 400A and 400B displayed via graphical user interfaces illustrating an example enhanced floor plan according to an embodiment. In the example screenshot 400A, a walkthrough path 410 is superimposed on a 2D floor plan model 420. The walkthrough path 410 includes a set of capture points that collectively demonstrate a route taken during a walkthrough of a floor shown in the 2D floor plan model 420. In the example screenshot 400B, an image icon 430 has been superimposed on the walkthrough path 410 and the 2D floor plan model 420. The image icon 430 is associated with one of the floor plan points of the walkthrough path 410 and may be superimposed in response to user interaction with the associated floor plan point (e.g., by a user clicking on the point via the graphical user interface).

In some implementations, the image icon 430 may be interacted with in order to, for example, cause display of a corresponding image, view annotations associated with the corresponding image, view historical visual multimedia content items showing the same or similar floor plan point on the walkthrough path 410 at a different time (e.g., images captured at an earlier time), and the like. For example, the image may be a 360 degree image captured by a 360 degree camera at a capture point of the walkthrough path 410 that is displayed when a user has interacted with that capture point. A same or similar floor plan point may be, for example, a floor plan point at the same position or approximately the same position (e.g., within a predetermined threshold distance).

Returning to FIG. 1, a graphical user interface including the enhanced floor plan may further allow users to annotate, add comments, and collaborate with respect to various issues (e.g., safety hazards) illustrated in the visual multimedia content. In an example implementation, the graphical user interface may allow for snapshots or links to such issues, thereby allowing for sharing of the issues among users. In some implementations, the annotations, comments, other textual content, and visual content of the enhanced floor plan may be searched, thereby allowing for identifying specific issues at the site with respect to the enhanced floor plan.

In an embodiment, machine learning techniques may be applied to the enhanced floor plan in order to identify issues (e.g., progress, quality and safety issues, and the like) based on previously identified issues. In an example implementation, visual multimedia content and associated identifications of issues may be included in a training data set utilized as inputs to a supervised learning process in order to generate a model for predicting a type of issue based on input visual multimedia content. The visual multimedia content may be associated with identifications of issues due to, for example, association of the visual multimedia content and respective issue identifications with the same floor plan points on previous enhanced floor plans. The model may be updated over time as new annotations, comments, and other content identifying issues in enhanced floor plans are provided by users.

In an embodiment, the enhanced floor plan may further include one or more temporal variations. Each temporal variation is a historical visual multimedia content item that demonstrates the state of the respective portion of the site at a different time. Accordingly, the enhanced floor plan may allow for viewing historical representations of the site over time (e.g., for the duration of construction). In a further embodiment, each floor plan point of the enhanced floor plan may be associated with historical visual multimedia content items of that floor plan point, thereby allowing for reviewing historical data for that floor plan point. Visual multimedia content items associated with the same floor plan point may be grouped into groupings of visual multimedia content items illustrating a state of the respective portion of the site at different times such that a most recent visual multimedia content showing one portion of the site is grouped with historical visual multimedia content showing previous views of the same portion of the site.

The enhanced floor plan may further include environmental parameters associated with respective floor plan points on the enhanced floor plan. The environmental parameters are determined based on sensor signals captured by sensors deployed at the site and may include, but are not limited to, temperatures, noise level (i.e., acoustic noise), volatile organic compound (VOC) level, humidity, smoke, dust particles, and the like.

The environmental parameters may be determined directly based on sensor signals or extrapolated based on the sensor signals. The extrapolation may be based on a location of capture of the sensor signal relative to the floor plan point associated with the extrapolated environmental parameter. In an example implementation, sensors used for determining the environmental parameters are deployed alongside visual multimedia content sensors during the walkthrough such that the environmental parameters are determined directly for capture points along a walkthrough path and extrapolated for floor plan points outside of the walkthrough path based on the nearest respective capture points. For example, an environmental parameter at a particular floor plan point may be a temperature that is determined directly based on readings from a temperature sensor deployed at the floor plan point or extrapolated based on readings from a temperature sensor that is deployed at the nearest capture point.

The enhanced floor plan may further include associations between portions of the visual multimedia content and environmental parameters of respective floor plan points shown in the portions of the visual multimedia content. A graphical user interface displaying the visual multimedia content upon interacting with floor plan points of the enhanced floor plan may further allow for displaying values of the environmental parameters when a user interacts with a portion of the visual multimedia content. For example, when a user hovers over a portion of a frame showing a floor plan point, a window including values of environmental parameters associated with the floor plan point may be displayed.

As a non-limiting example for associating environmental parameters with portions of visual multimedia content, an image may show a room including a corner and a doorway. A first floor plan point that is occupied by the corner is associated with a temperature of 65 degrees F. and a second floor plan point that is occupied by the doorway is associated with a temperature of 67 degrees F. When the image is displayed via a graphical user interface and a user's mouse hovers over the corner, a window with text "Temperature=65 degrees F." may be displayed. Likewise, when the user's mouse hovers over the doorway, a window with text "Temperature=67 degrees F." may be displayed.

It should be noted that the embodiments described herein above with respect to FIG. 1 are described with respect to one user device 130 merely for simplicity purposes and without limitation on the disclosed embodiments. Multiple user devices may be equally utilized without departing from the scope of the disclosure, thereby allowing for creating enhanced floor plans for sites visited by different users.

Figure 2:
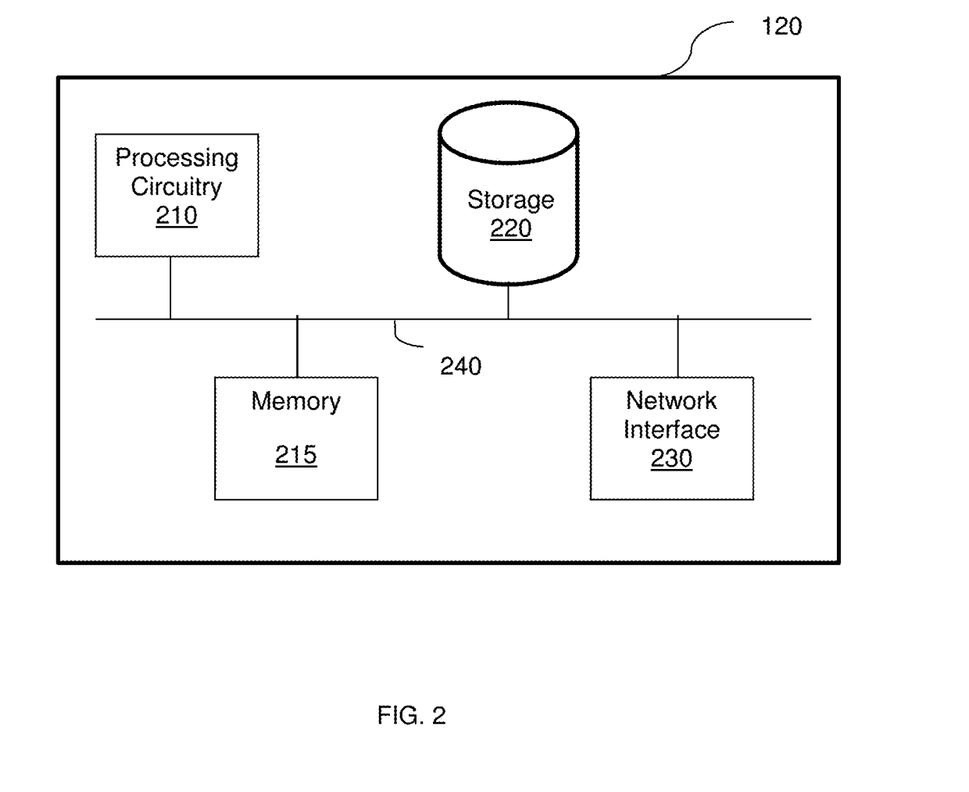
FIG. 2 is a schematic diagram of a floor plan enhancer according to an embodiment.

FIG. 2 is an example schematic diagram of the floor plan enhancer 120 according to an embodiment. The floor plan enhancer 120 includes a processing circuitry 210 coupled to a memory 215, a storage 220, and a network interface 230. In another embodiment, the components of the floor plan enhancer 120 may be communicatively connected via a bus 240.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform one or more of the processes described herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The network interface 230 allows the floor plan enhancer 120 to communicate with the user device 130, the database 140, the 3D sensors 150, or a combination thereof, for the purpose of, for example, receiving visual multimedia content and 3D sensor data, retrieving 2D floor plan models and 3D building information models, storing enhanced floor plans, and the like.

It should be understood that the embodiments described herein are not limited to the specific architecture illustrated in FIG. 2, and other architectures may be equally used without departing from the scope of the disclosed embodiments.

Figure 3:
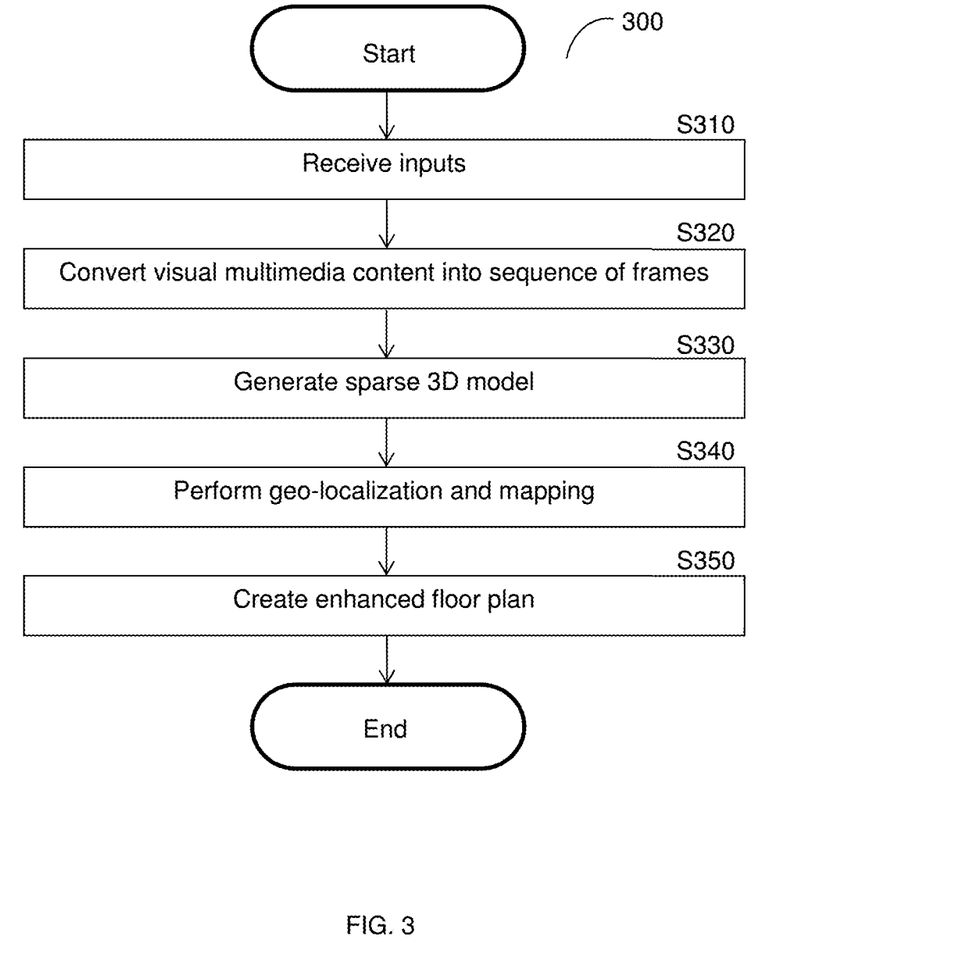
FIG. 3 is a flowchart illustrating a method for creating an enhanced floor plan according to an embodiment.

FIG. 3 is an example flowchart 300 illustrating a method for creating an enhanced floor plan according to an embodiment. In an embodiment, the method may be performed by the floor plan enhancer 120, FIG. 1.

At S310, visual multimedia content showing a site is received. The visual multimedia content may be 2D or 3D and includes visual multimedia content items such as, but not limited to, images, video, or both. When the visual multimedia content includes 2D images, 3D characteristic data such as LIDAR measurements may also be received at S310. In an embodiment, S310 may further include receiving an input floor plan to be enhanced or receiving a floor identifier that may be utilized to retrieve the floor plan to be enhanced.

At S320, the received visual multimedia content is converted into a sequence of frames. Each frame is a 2D image. When the visual multimedia content includes 2D content, the frames may include 2D images among the visual multimedia content, frames of 2D video of the multimedia content, or both (i.e., a combination of 2D images and frames of 2D videos). To this end, converting the 2D content into a sequence of frames may include generating copies of the 2D images, generating frames based on the 2D video, or both.

When the visual multimedia content includes 3D content, two or more frames may be generated for each 3D image or each of at least one portion of a 3D video. The two or more frames generated for 3D content may include 2D images that collectively show the entire view illustrated in the 3D content. When the visual multimedia content includes 3D video, converting the visual multimedia content into a sequence of frames may include identifying portions of the 3D video, then converting each 3D video portion into two or more 2D images.

At S330, based on the sequence of frames, a sparse 3D model of the site is generated. The sparse 3D model is a 3D representation of the site including a point cloud. The point cloud includes feature reference points representing respective portions of any portions of the site such as objects or other visual features (e.g., edges of walls, flat surfaces such as floors and ceilings, and the like) illustrated in the visual multimedia content.

In an embodiment, when the visual multimedia content includes 2D images, the sparse 3D model is generated based on a sequence of frames including the 2D images and 3D characteristic data captured by one or more sensors deployed at the site (e.g., the 3D characteristic sensors 150, FIG. 1).

In an embodiment, S330 may include removing portions of visual multimedia content showing noisy features from the frames before generating the sparse 3D model. The noisy features may be identified using a features dictionary as described herein above. Specifically, the noisy features may include features matched to predetermined features indicated as noisy in the features dictionary. Thus, processing related to the noisy features is reduced when generating the sparse 3D model. When the enhanced floor plan is created, the noisy features may be added back into the frames such that the frames, when displayed via interactions with the enhanced floor plan, show the original images including the noisy features.

At S340, the sparse 3D model is geo-localized and mapped with respect to an input site layout model. The geo-localization and mapping includes at least identifying matching features of the input site layout model for the sparse 3D model. The input site layout model may be a 2D floor plan model or a 3D building information model. In an embodiment, S340 includes either converting the sparse 3D model to a 2D site model and matching features of the 2D site model to an input 2D floor plan model or matching features of the sparse 3D model to features of a 3D building information model.

In an embodiment, the feature matching may be based on matching of a distinct set of features that uniquely identify a portion of the site between the sparse 3D model or 2D site model and a site layout model. Each feature may be matched with respect to a number of feature reference points per feature. The features may include, but are not limited to, corners, columns, and the like. Based on the matching features, an orientation of the 3D sparse model or the 2D site model relative to the site layout model is determined. As a non-limiting example, a corner of a building may be a feature having four feature reference points. Matching the corner as shown in a 2D site model to the corner as shown in the 2D floor plan model allows for determining the orientation of the 2D site model to that of the 2D floor plan model, for example, a 90-degree clockwise rotation of the corner as seen in the 2D site model relative to the corner as shown in the 2D floor plan model indicates that the 2D site model is oriented 90 degrees clockwise from the 2D floor plan model.

In an embodiment, a portion of the geo-localization may be performed based on a previously mapped portion of the 3D sparse model and one or more environmental sensor signals related to movement during the walkthrough (e.g., readings from a gyroscope, accelerometer, and the like). Specifically, the location, orientation, or both, of a camera at a capture point along the walkthrough path with respect to the floor plan may be utilized in combination with the movement-based sensor signals to determine a location, orientation, or both, of the camera at a subsequent capture point along the walkthrough path indirectly rather than directly based on features. Geo-localizing and mapping some of the points of the sparse 3D model based on previous locations and movement-based sensor signals rather than mapping all points based on feature comparisons may reduce use of computing resources related to determining subsequent locations along a walkthrough path.

At S350, an enhanced floor plan is created. In an embodiment, S350 includes superimposing the mapped sparse 3D model to the 3D building information model or superimposing the mapped 2D site model to the 2D floor plan model. To this end, S350 may further include generating a graphical user interface (GUI) including the enhanced floor plan. One or more floor plan points on the enhanced floor plan may be associated with corresponding portions of the visual multimedia content that, for example, were captured at the respective floor plan points, show the respective floor plan points, and the like. Interacting with the GUI may allow, for example, adding comments and annotations, viewing portions of the visual multimedia content, viewing historical data of the enhanced floor plan ("time travel"), and the like.

In an embodiment, generating the GUI further includes adding previously removed noisy features back into visual multimedia content of the site. Thus, when visual multimedia content is displayed in response to interactions with the GUI, the displayed visual multimedia content includes the noisy features.

It should be noted that various embodiments are described with respect to creating an enhanced floor plan for a site. The site may be any 3D location or portion thereof that may be represented as a 2D or 3D model such as, but not limited to, a floor of a building under construction, a room of a building under construction, an outdoor location in which structures are erected (e.g., a location of a street fair in which tents and amusement rides are constructed, a location of a park including statues and playground equipment, etc.), a highway or other portion of road, virtual versions thereof (e.g., a floor of a building to be rendered via virtual reality programs), and the like.

It should be also noted that various embodiments are described with respect to floor plan models merely for simplicity purposes and without limitation on the disclosed embodiments. The disclosed embodiments may be equally applicable to other locations, regardless of whether they are typically characterized as a "floor." As a non-limiting example, the disclosed embodiments may be utilized to provide an enhanced map of an outdoor site rather than a floor of a building.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for creating enhanced geo-localized floor plans, comprising:
   generating a plurality of frames based on visual multimedia content, wherein the visual multimedia content shows a site, wherein each frame is a two-dimensional (2D) image showing a portion of the site;
   identifying a plurality of frame features shown in the plurality of frames based on a features dictionary including a plurality of dictionary features and a plurality of respective arrangements of dictionary feature reference points, wherein the features dictionary further indicates whether each of the plurality of predetermined dictionary features is a known noisy feature;
   determining, based on the features dictionary and the plurality of frame features, at least one noisy frame feature among the plurality of frame features;
   removing at least a portion of the plurality of frames showing the at least one noisy frame feature to create a plurality of reduced noise frames;
   generating, based on the plurality of reduced noise frames, a sparse three-dimensional (3D) model of the site
   identifying a plurality of matching features of a site layout model with respect to the sparse 3D model, wherein each of the plurality of matching features is a matching distinct feature set identified in the site layout model, wherein each distinct feature set defines a matching feature of the plurality of matching features with respect to a respective arrangement of feature reference points that does not change based on an orientation of the respective matching feature within the sparse 3D model;
   determining an orientation of features of the sparse 3D model with respect to the site layout model; and
   superimposing the features of the sparse 3D model on the plurality of matching features of the site layout model based on the determined orientation in order to create an enhanced floor plan, wherein the enhanced floor plan includes a plurality of floor plan points of the site layout model associated with respective portions of the sparse 3D model.

2. The method of claim 1, further comprising:
   adding the removed at least a portion of the plurality of frames to the plurality of reduced noise frames to create a plurality of restored frames, wherein the enhanced floor plan further includes associations between the plurality of floor plan points and respective frames of the plurality of restored frames.

3. The method of claim 1, wherein the visual multimedia content includes at least one first visual multimedia content item, wherein each of the at least one first visual multimedia content item is associated with one of the plurality of floor plan points in the enhanced floor plan, wherein each of the at least one first visual multimedia content item is at least one of an image and a video.

4. The method of claim 3, wherein each of the at least one first visual multimedia content item is further associated with at least one annotation.

5. The method of claim 3, wherein each of the at least one first visual multimedia content item is grouped with at least one second visual multimedia content item showing the same portion of the site as the first visual multimedia content item, wherein each of the at least one second visual multimedia content item is captured at a different time than the at least one first visual multimedia content item.

6. The method of claim 3, further comprising:
generating a graphical user interface including the enhanced floor plan such that the generated graphical user interface shows the enhanced floor plan when displayed, wherein the graphical user interface is configured to cause display of the associated visual multimedia content item when a user interacts with one of the plurality of floor plan points.

7. The method of claim 6, further comprising:
determining a plurality of environmental parameters based on sensor signals captured by sensors at the site, wherein the enhanced floor plan further associates each of the plurality of environmental parameters with a portion of the plurality of frames, wherein the graphical user interface is further configured to cause display of a textual representation of at least one associated environmental parameter when a user interacts with the associated portion of the plurality of frames.

8. A non-transitory computer readable medium having stored thereon instructions for causing a processing circuitry to execute a process, the process comprising:
generating a plurality of frames based on visual multimedia content, wherein the visual multimedia content shows a site, wherein each frame is a two-dimensional (2D) image showing a portion of the site;
identifying a plurality of frame features shown in the plurality of frames based on a features dictionary including a plurality of dictionary features and a plurality of respective arrangements of dictionary feature reference points, wherein the features dictionary further indicates whether each of the plurality of predetermined dictionary features is a known noisy feature;
determining, based on the features dictionary and the plurality of frame features, at least one noisy frame feature among the plurality of frame features;
removing at least a portion of the plurality of frames showing the at least one noisy frame feature to create a plurality of reduced noise frames;
generating, based on the plurality of reduced noise frames, a sparse three-dimensional (3D) model of the site
identifying a plurality of matching features of a site layout model with respect to the sparse 3D model, wherein each of the plurality of matching features is a matching distinct feature set identified in the site layout model, wherein each distinct feature set defines a matching feature of the plurality of matching features with respect to a respective arrangement of feature reference points that does not change based on an orientation of the respective matching feature within the sparse 3D model;
determining an orientation of features of the sparse 3D model with respect to the site layout model; and
superimposing the features of the sparse 3D model on the plurality of matching features of the site layout model based on the determined orientation in order to create an enhanced floor plan, wherein the enhanced floor plan includes a plurality of floor plan points of the site layout model associated with respective portions of the sparse 3D model.

9. A system for creating enhanced geo-localized floor plans, comprising:
a processing circuitry; and
a memory, the memory containing instructions that, when executed by the processing circuitry, configure the system to:
generate a plurality of frames based on visual multimedia content, wherein the visual multimedia content shows a site, wherein each frame is a two-dimensional (2D) image showing a portion of the site;
identify a plurality of frame features shown in the plurality of frames based on a features dictionary including a plurality of dictionary features and a plurality of respective arrangements of dictionary feature reference points, wherein the features dictionary further indicates whether each of the plurality of predetermined dictionary features is a known noisy feature;
determine, based on the features dictionary and the plurality of frame features, at least one noisy frame feature among the plurality of frame features;
remove at least a portion of the plurality of frames showing the at least one noisy frame feature to create a plurality of reduced noise frames;
generate, based on the plurality of reduced noise frames, a sparse three-dimensional (3D) model of the site
identify a plurality of matching features of a site layout model with respect to the sparse 3D model, wherein each of the plurality of matching features is a matching distinct feature set identified in the site layout model, wherein each distinct feature set defines a matching feature of the plurality of matching features with respect to a respective arrangement of feature reference points that does not change based on an orientation of the respective matching feature within the sparse 3D model;
determine an orientation of features of the sparse 3D model with respect to the site layout model; and
superimpose the features of the sparse 3D model on the plurality of matching features of the site layout model based on the determined orientation in order to create an enhanced floor plan, wherein the enhanced floor plan includes a plurality of floor plan points of the site layout model associated with respective portions of the sparse 3D model.

10. The system of claim 9, wherein the system is further configured to:
add the removed at least a portion of the plurality of frames to the plurality of reduced noise frames to create a plurality of restored frames, wherein the enhanced floor plan further includes associations between the plurality of floor plan points and respective frames of the plurality of restored frames.

11. The system of claim 9, wherein the visual multimedia content includes at least one first visual multimedia content item, wherein each of the at least one first visual multimedia content item is associated with one of the plurality of floor plan points in the enhanced floor plan, wherein each of the at least one first visual multimedia content item is at least one of an image and a video.

12. The system of claim 11, wherein each of the at least one first visual multimedia content item is further associated with at least one annotation.

13. The system of claim 11, wherein each of the at least one first visual multimedia content item is grouped with at least one second visual multimedia content item showing the same portion of the site as the first visual multimedia content item, wherein each of the at least one second visual multimedia content item is captured at a different time than the at least one first visual multimedia content item.

14. The system of claim 11, wherein the system is further configured to:
   generate a graphical user interface including the enhanced floor plan such that the generated graphical user interface shows the enhanced floor plan when displayed, wherein the graphical user interface is configured to cause display of the associated visual multimedia content item when a user interacts with one of the plurality of floor plan points.

15. The system of claim 14, wherein the system is further configured to:
   determine a plurality of environmental parameters based on sensor signals captured by sensors at the site, wherein the enhanced floor plan further associates each of the plurality of environmental parameters with a portion of the plurality of frames, wherein the graphical user interface is further configured to cause display of a textual representation of at least one associated environmental parameter when a user interacts with the associated portion of the plurality of frames.

* * * * *